United States Patent [19]

Buettgen et al.

[11] Patent Number: 5,110,508

[45] Date of Patent: May 5, 1992

[54] PROCESS AND APPARATUS FOR MAKING A HEAT-SENSITIVE MATERIAL

[75] Inventors: Karl-Heinz Buettgen, Karpen-Sindorf; Bernhard Gutsche, Hilden; Friedrich Hommers, Duesseldorf; Wilhelm Johannisbauer, Erkrath; Eberhard Peukert, Hilden; Reinhold Sedelies, Ratingen, all of Fed. Rep. of Germany

[73] Assignee: Henkel Kommanditgesellschaft auf Aktien, Duesseldorf-Holthausen, Fed. Rep. of Germany

[21] Appl. No.: 340,977

[22] Filed: Apr. 20, 1989

[30] Foreign Application Priority Data

Apr. 22, 1988 [DE] Fed. Rep. of Germany ....... 3813612
Aug. 3, 1988 [DE] Fed. Rep. of Germany ....... 3826320

[51] Int. Cl.$^5$ ................................................ C09F 5/08
[52] U.S. Cl. ...................... 554/170; 560/84; 560/181; 554/69; 554/167; 554/168; 554/169; 554/172; 554/173
[58] Field of Search .................... 260/410; 560/84, 181

[56] References Cited

U.S. PATENT DOCUMENTS 3,703,502 11/1972 Venderbos et al. .............. 260/80.78

FOREIGN PATENT DOCUMENTS 178669  4/1986 European Pat. Off. .
862153  7/1949 Fed. Rep. of Germany .
21702  8/1956 Fed. Rep. of Germany .
1121051  1/1962 Fed. Rep. of Germany .
1909315  2/1969 Fed. Rep. of Germany .
1918519  10/1969 Fed. Rep. of Germany .
2335307  1/1974 Fed. Rep. of Germany .
8712301  9/1987 Fed. Rep. of Germany .
3130986  3/1988 Fed. Rep. of Germany .
1322701  7/1973 United Kingdom .
1430069  3/1976 United Kingdom .

OTHER PUBLICATIONS

H. Stage, *Fette-Seinfen-Anstrichmittel*, vol. 76, 1974, pp. 197-206 and 244-260.

*Primary Examiner*—Paul J. Killos
*Attorney, Agent, or Firm*—Ernest G. Szoke; Wayne C. Jaeschke; Henry E. Millson, Jr.

[57] ABSTRACT

The invention relates to a process, more especially a discontinuous process, for conducting a reaction taking place at elevated temperature in which heat-sensitive products are formed. To increase the volume-time yield, a heat transfer unit independent of the reactor is used for heating. The invention also relates to an apparatus for the production of heat-sensitive products at elevated temperatures. This apparatus comprises a reactor and a heating system. To increase the volume-time yield, the heating system comprises at least one heat transfer unit arranged outside and connected to the reactor.

11 Claims, 2 Drawing Sheets

PROCESS AND APPARATUS FOR MAKING A HEAT-SENSITIVE MATERIAL

BACKGROUND OF THE INVENTION

1. Field of the Invention

This invention relates to a process for conducting a reaction taking place at elevated temperature in which heat-sensitive products are formed.

2. Description of the Related Art

The invention relates in particular to discontinuous processes, such as esterification, transesterification, glycerinolysis, aminolysis and Guerbet reactions. The reaction mixture, which, in the case of esterification reactions for example, may consist of fatty acids, alcohols, catalysts and, optionally, other reactants, is introduced into a stirred tank reactor and heated to the reaction temperature which is normally in the range from about 200° to 250° C. The reactor is heated by pipe coils arranged externally on and/or in the tank through which a heating medium, for example heating steam, flows. The heating phase is followed by reaction times of from about 3 to 20 hours. The products are then cooled and purified.

Since the heat exchange surface to be installed in or on the reactor is limited by the predetermined geometry and dimensions of the stirred reactor, the volume-time yield also has an upper limit. The reaction also cannot be carried out at a higher temperature to increase throughput because the products formed and, generally, the products used are sensitive to heat. This sensitivity to heat leads to partial decomposition, to cracking processes and other secondary sections. Secondary reactions involving the desired reaction products also occur to a significant extent.

In addition, the increase in boiling point in that part of the reaction mixture which is situated at the bottom of the stirred tank reactor prevents the rapid dissipation of overheating which also results in unwanted secondary reactions.

SUMMARY OF THE INVENTION

It is an object of the present invention is to provide a process of the type mentioned at the beginning and an apparatus for carrying out this process which provide for a higher volume-time yield than known processes and apparatus without causing any thermal damage to the products and without any unwanted secondary reactions.

According to the invention, this object is achieved in a process comprising the steps of (1) forming a reacting mixture in a reaction zone, (2) continuously circulating said reacting mixture over a film heat exchanger, and (3) returning at least a portion of said reacting mixture to said reacting zone. The invention also specifically includes reacting mixtures in the form of suspensions containing one or more solids.

DESCRIPTION OF THE PREFERRED EMBODIMENTS

Figure 1:
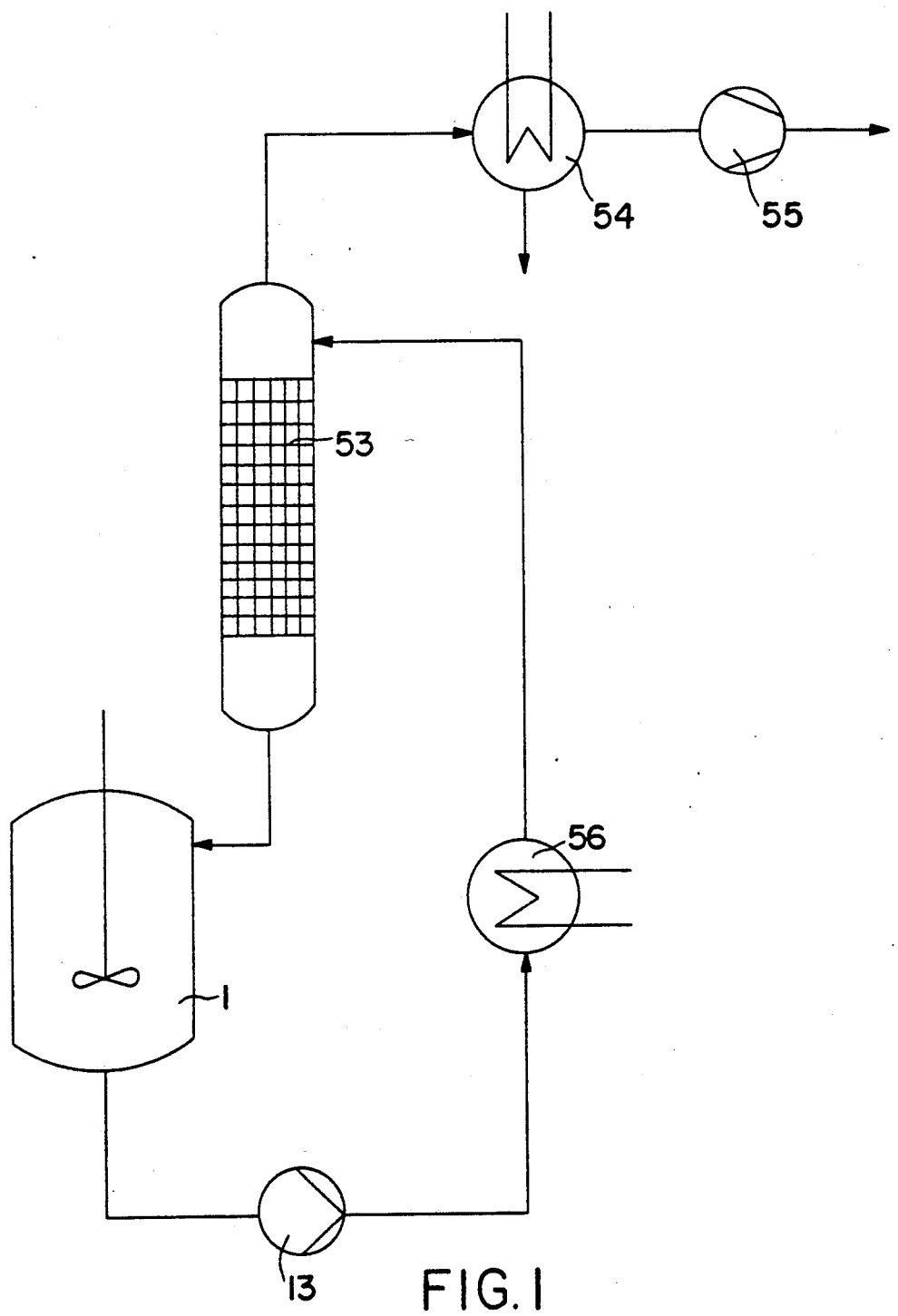
FIG. 1 illustrates an arrangement for the batch-wise production of a heat-sensitive compound.

Other than in the operating examples, or where otherwise indicated, all numbers expressing quantities of ingredients or reaction conditions used herein are to be understood as modified in all instances by the term "about".

The separation of the process steps of heating and/or cooling and reaction of the present invention means that the heat exchange surfaces required for heating and cooling are no longer limited by the geometric dimensions of the reactor as predetermined by the reaction. Accordingly, the heat exchange surface can be designed and enlarged irrespective of the construction and dimensions of the reactor. It is thus possible in accordance with the invention to use a reactor which is optimally adapted to the particular course of the reaction, although its choice is not determined by the heat-exchange properties, and on the other hand to select a heat transfer unit which has optimal heat exchange properties although its choice is largely unaffected by the course of the reaction.

By virtue of the relatively large—based on volume phase—interface, i.e. in the case of a film by virtue of the minimal thickness of the film and the large liquid surface, the product formed during the reaction, which is volatile at the elevated temperature, can escape quickly from the reaction mixture. The relatively quick removal of this reaction product leads to a shift in the reaction equilibrium and hence to a higher net reaction velocity, i.e. to a reduction in the reaction time. Through the elimination of the hydrostatic pressure in the heating unit and the shorter residence time of the reaction product in the heated zone, the reaction mixture is not overheated on the heating surfaces and better product quality is obtained.

Since the batch time, which is the product of the reaction time, the heating and cooling times and—with certain reactions—the time taken to distill off condensation products, is determined to a very large extent by the size of the heat exchange surfaces, the total batch time can be reduced and, hence, the volume-time yield considerably increased in accordance with the invention.

Problems of increasing the volume-time yield arise in equilibrium reactions which take place at elevated temperature and in which a reaction product has to be removed in gaseous form from the reaction mixture to reach the final conversion. This is particularly the case with processes for the production of esters from carboxylic acids and alcohols. Esterification reactions are typical equilibrium reactions in which relatively high yields can only be obtained by the continuous removal of water of reaction. On account of the small liquid surface of the reaction solution where a stirred tank reactor is used, the mass transfer of the water of esterification into the gas phase, which is continuously removed, is minimal. In addition, unwanted secondary reactions ensue from the resulting relatively long reaction time.

Accordingly, the reaction time and, hence, another part of the batch time are largely determined by the rate at which the water of reaction can be distilled off. If the reaction is carried out in a stirred tank reactor, the disadvantage that the distillation rate is relatively slow and hence the reaction time relatively long on account of the relatively large ratio of reaction volume to liquid surface has to be accepted.

To obviate this disadvantage, it is proposed, particularly for discontinuous processes for conducting equilibrium reactions taking place at elevated temperatures, in which a reaction product has to be removed in gaseous form from the reaction mixture to reach the final conversion, that a unit separate from the reactor, in which the reaction mixture present in the form of a liquid or suspension has a larger liquid-gas phase interface than in the reactor, is used for removing the reaction product. This separation of the process steps of reaction and mass transfer between liquid and gas enables the separate unit mentioned to be designed for optimal mass transfer between liquid and gas irrespective of the requirements of the reaction. To this end, this unit should provide for as large a specific liquid surface as possible.

To obtain a large liquid surface, the liquid has to be divided up into droplets or thin films. Accordingly, it is further proposed that a spray unit, more especially a spray column, be used as the unit separate from the reactor. However, other dispersion units may also be used. It is important that the units in question be suitable not only for liquids, but also for the fine spraying of suspensions, so that any catalyst present or one or more educts may be solid.

Where solids are used as the dispersed catalysts or as reactants in the process according to the invention, the dispersion unit for the liquid should be specially designed in such a way that no solid can be deposited. In addition, the circulation pump should be specially designed to avoid wear or seizing.

The properties of the liquid play an important part in the choice of the dispersion unit separate from the reactor. In the case of relatively high viscosities, a spray unit for example is a suitable dispersion unit. In other cases, plate-type, packing-type and also falling-film or thin-layer apparatus are suitable.

The above-mentioned heat transfer unit used for heating, which is separate from the reactor, may be any conventional apparatus. For example, it may be a tube-bundle, plate-type, spiral or falling-film or thin-layer heat exchanger. However, it is important to ensure that this heat transfer unit is a film heat transfer unit. For purposes of this invention, a film heat-transfer unit is one that has a high heat transfer coefficient, a minimal temperature difference and a short residence time for the material being heated so that careful heating is possible. This is accomplished by passing the material to be heated through the heat exchanger in the form of a thin film so that it has a large surface-to-volume ratio. Since the reaction takes place in a reactor separate from the heat transfer unit, but has to be kept at the reaction temperature by the heat transfer unit, it is further proposed that the reaction mixture be transported continuously through the heat transfer unit or rather the unit separate from the reactor.

The removal of a reaction product, for example the water of reaction formed during esterification, from the liquid phase is facilitated by operation of the unit at reduced pressure. To reduce the partial pressure of the water to be evaporated, it is also possible to pass an inert gas through the unit.

In another advantageous embodiment of the invention, the reaction mixture is cooled in the heat transfer unit on completion of the reaction, for which purpose a cooling medium is supplied to the heat transfer unit. This embodiment of the process is particularly simple because it eliminates the need for an additional cooler. Particularly rapid cooling of the reaction product can be achieved through the large exchange surface of the heat transfer unit and the better transfer of heat. It is thus possible to freeze temperature-dependent equilibrium positions of products and largely or very largely to avoid unwanted secondary reactions.

In another advantageous embodiment of the invention, the reaction product is purified after the reaction by subsequent distillation in the unit separate from the reactor. In conventional plants, the product often has to be transferred after the reaction to an external distillation apparatus for purification purposes. By contrast, it is possible by the process according to the invention directly to carry out distillation at low temperature in the unit mentioned, for example in a film evaporator. Distillation may also be carried out in an arrangement of an external heat transfer unit with a liquid dispersion unit.

In one particular embodiment of the invention, the reaction mixture is heated to the reaction temperature in the unit separate from the reactor.

In another advantageous embodiment of the invention, a film evaporator, more especially a falling film evaporator, is used as this unit.

The process according to the invention is suitable not only for esterification reactions, but also for condensation and transesterification reactions, more particularly for glycerinolysis, aminolysis and Guerbet reactions. Through the use of the external heat transfer unit and hence by virtue of the considerably increased heat exchange surfaces and the better transfer of heat on the product side, the necessary heating and cooling times are clearly reduced. The reaction mixture is thus exposed to high temperatures for much shorter times both during heating and during the reaction and also during cooling, so that unwanted secondary reactions are largely suppressed. The fact that there are no secondary reactions also means that there is no need for elaborate purification processes, such as deodorization and bleaching of the products.

Relatively high conversion levels may be achieved during the reaction itself because far better conditions prevail in the evaporator for the transfer of the water of reaction into the gas phase. Through the removal of the gas phase, the reaction product, for example water or alcohol, is removed from the equilibrium system, thereby preventing any back-reaction. The desired amount of reaction product is thus obtained after very much shorter reaction times.

The present invention also relates to an apparatus for the production of heat-sensitive products at elevated temperature comprising a reactor and a heating unit in the form of at least one heat transfer unit arranged outside and connected to the reactor. In this apparatus, the available heat-exchange area is not limited by the size of the reactor, but depends solely on the design of the heat transfer unit. The reaction mixture can thus be heated and cooled considerably more quickly.

In one particularly advantageous embodiment, the heat transfer unit is in the form of a falling film evaporator. Evaporators of this type have a particularly large exchange surface and minimal film thickness of the reaction mixture to be heated. Particularly rapid and homogeneous heating is thus possible. However, for high-viscosity reaction mixtures, thin-layer evaporators, in which the film is formed by mechanical spreading of the reaction solution, are best used when there is no corresponding film formation in the falling film evaporator. Short-path evaporators are suitable above all for systems involving substantially involatile reaction products (for example perfumes) where a high-purity product is to be separated off.

In one particularly advantageous embodiment, the film evaporator is arranged directly on the reactor via a connecting pipe. In this way, the vapors formed can be removed from and can enter the reactor. In countercurrent operation, the vapors may be directly removed at the head of the evaporator. The falling film apparatus mounted vertically on the reactor may be a tube bundle of virtually any size. In operation, the liquid is pumped from the reactor to the head of the falling film heat exchanger. The liquid film flows down on the inside and back into the reactor in the form of a thin film. Only a slight temperature difference is thus necessary between the product and the heating medium in the outer space of the tube bundle. As a result, the products are only subjected to thermal stressing during short residence times on the heated surfaces.

If the starting materials are solid at ambient temperature, a jacket heating system may be arranged on the outer jacket of the reactor for the melting of solid starting materials or for maintaining the temperature in the reactor.

The invention has been carried out and tried out in numerous tests. Particular success was achieved in the production of fumarates and oleic acid oleyl ester where the reaction time was reduced considerably, i.e. by more than 50%. The total batch time was also reduced in the manufacture of other products although the reaction time remained the same in some cases.

In one advantageous embodiment, the reactor, a circulation pump and the heat transfer unit are arranged in series in a circuit. The separation of heating and reaction according to the invention can be achieved in this way.

In another advantageous embodiment, the apparatus or plant according to the invention comprises a unit having a larger liquid-gas phase interface than the reactor, to the entrance of which the exit of this unit is connected. The unit may be a film column or a spray column or any other apparatus for increasing the liquid surface. The reaction mixture flows from this unit back into the reactor after a relatively large quantity of volatile secondary product, such as water of esterification, has evaporated.

In addition, the unit may advantageously be arranged in the reactor, but above the continuous liquid surface.

Examples of embodiment of the invention are described in detail in the following with reference to the accompanying drawings.

The products produced in one embodiment were fumarates. The starting material, fumaric acid, with a melting point of 300° C. is present as a solid during the reaction to a level of initially 30%. The plant according to the invention could nevertheless be started up and operated without difficulty because it was equipped for the circulation and transport of solids-containing liquids. There were also no deposits of product on the liquid dispersion unit of the falling film evaporator serving as the heat transfer unit.

In the apparatus according to the invention, the improvement in mass transfer reduces the necessary reaction temperature for fumarate production from 220° C. in a stirred tank reactor to around 180° C. where a falling film evaporator is used for heating.

The present invention, in which an external heat exchanger, more especially a falling film evaporator, is used to heat a discontinuously operated reactor, proved successful for all the products tested. In addition to the reduction in batch time during the heating phase by virtue of the improvement in heat transfer and the fact that the heat exchange surface can be increased almost as required compared with a stirred tank reactor equipped with a jacket heating system, distinctly shorter reaction times were also obtained with some of the tested products. In addition, the less product-damaging effect of the procedure according to the invention through the lower reaction and heating-surface temperatures provides for an improvement in the quality of particularly sensitive products.

A model calculation for the plant according to the invention as described above produced a possible reduction in batch time of more than 5 hours, quite apart from other product-specific advantages during the reaction phase, in a comparison of the heating and cooling phase of a plant according to the invention equipped with external heat exchangers with the known, simple, jacket-heated stirred-tank reactor.

One of the possible apparatus according to the invention is schematically illustrated in FIG. 1. The reaction mixture circulates through the units (1), (13), (56) and (53). The condensate is removed via the condenser (54) and the vacuum pump (55).

The circulation pump (13) pumps the reaction mixture from the reactor (1) through the heat transfer unit (56) into the column (53) which may be a film or spray column.

After its liquid constituents have been removed via the condenser (54) and the vacuum pump (55), the reaction mixture flows or drips from the column (53) back into the reactor (1).

Figure 2:
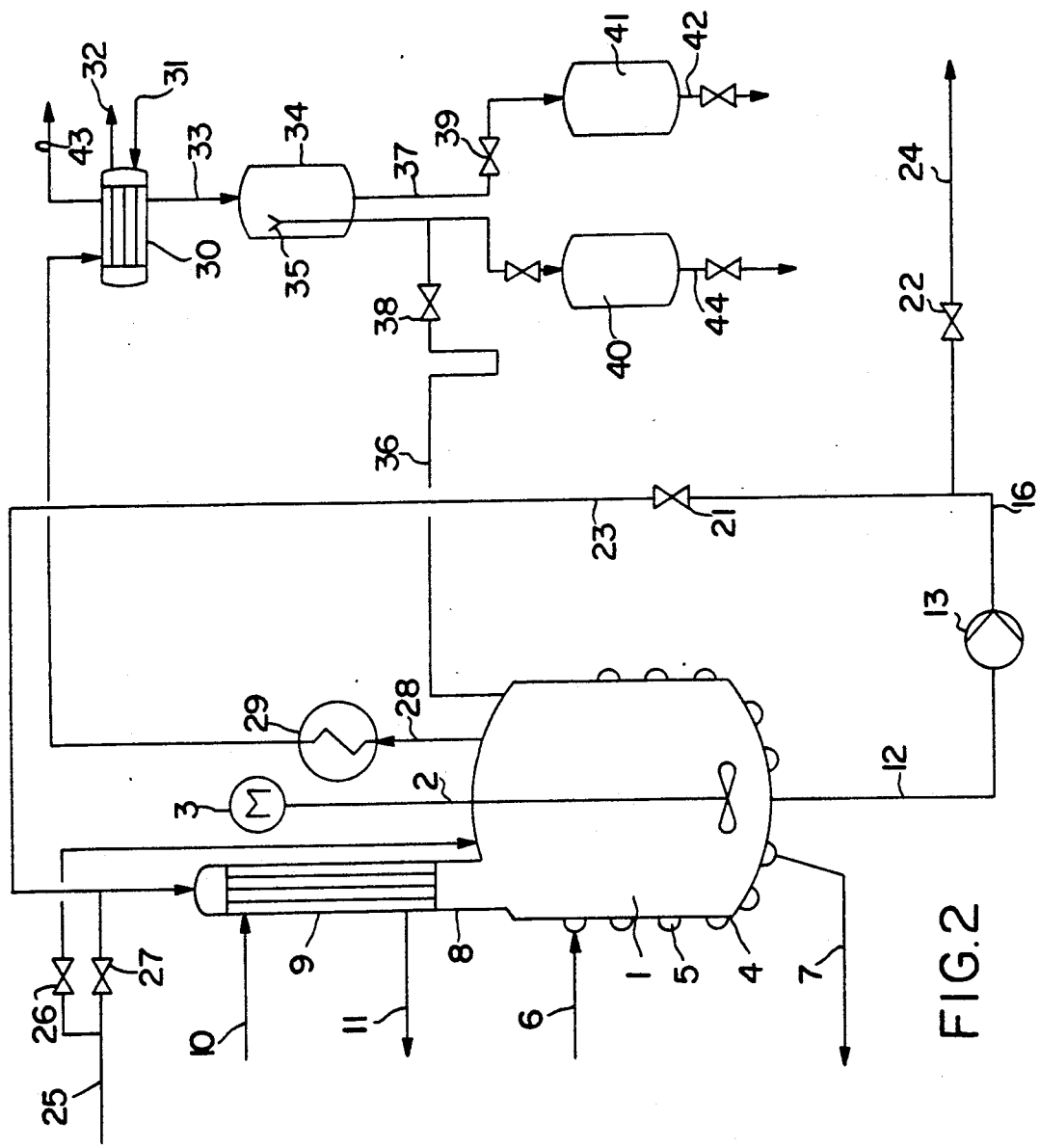
FIG. 2 illustrates a multi-purpose arrangement for the batch-wise production of a heat-senstive compound.

FIG. 2 shows a more detailed flow chart of a multipurpose reactor installation comprising an external heating and cooling system according to the invention.

A multipurpose reactor for esterification and transesterification reactions or the like comprises a reactor (1) with a stirrer (2) and a stirrer motor (3). A jacket heating system (5), through which a heating medium, such as heating steam, is passed via pipes (6) and (7), is arranged on the outer jacket (4) of the reactor (1).

Arranged in the upper part of the reactor (1) is a connecting pipe (8) on which a falling film evaporator (9) is mounted. The falling film evaporator (9) is supplied with a heating or cooling medium through pipes (10) and (11).

A circulation pipe (12), in which a delivery pump (13) is arranged, leads away from the reactor (1). The pipe (16) leading out of the delivery pump (13) is branched by two valves (21 and 22) into a return pipe (23) and a product discharge pipe (24), the return pipe (23) being returned via the falling film evaporator (9) to the reactor (1).

A feed pipe (25) leads into the reactor (1) and the falling film evaporator (9) via two valves (26 and 27).

A vapor pipe (28) is arranged on the reactor (1), being guided through a heat exchanger (29). The vapor pipe (28) opens into a condenser (30) through which a cooling fluid flows via pipes (31),(32). Arranged at the exit of the condenser (30) is a pipe (33) which opens into a separator (34) with a separation layer controller (35). A return pipe (36) is connected to the separation layer controller (35), being returned to the reactor (1) via the valve (38). However, the product can also be passed into the container (40). Reduced pressure can be generated in the system via the pipe (43) connected to the condenser (30).

Arranged at the foot of the separator (34) is a pipe (37) which opens through a valve (39) into the container (41). The contents of the containers (40,41) may be removed through the pipes (42,44).

The starting materials are fed to the reactor (1) through the feed pipe (25). The starting materials are either fed directly into the reactor (1) by opening of the valve (26) if they are solid or are fed into the reactor (1) via the falling film evaporator (9) for preheating by opening of the valve (27). When the reactor (1) is full, the valves (26) and (27) are closed. If only solid starting materials are involved, the reactor (1) is heated by the jacket heating system (5) to obtain a suspension or a liquid mixture. The stirrer (2) ensures that homogeneous dispersion is always achieved in the reactor (1). At the same time, the particular reaction temperature is maintained in the reactor (1) by the jacket heating system (5).

For further heating and during the reaction phase, the starting material is removed from the reactor (1) via the circulation pipe (12) by the delivery pump (13) and passes through the pipe (16) and the return pipe (23) into the falling film evaporator (9) where it is heated before returning to the reactor (1) via the connecting pipe (8).

The delivery pump (13) then pumps the reaction mixture continuously about 5 to 20 times per hour successively through the circulation pipe (12), the pipe (16) and the return pipe (23) in a circuit through the falling film evaporator (9) and the reactor (1). After a certain heating-up time, vapors are formed in the evaporator (9), containing in particular evaporated water and alcohol in esterification and transesterification reactions, glycerinolysis, aminolysis and Guerbet reactions.

The vapors pass from the falling film evaporator (9) via the reactor (1) into the vapor pipe (28) and are partly cooled in the heat exchanger (29), so that the liquid component flows back into the reactor (1) while the remaining vapors are guided into the condenser (30) and are cooled therein. The liquefied vapors flow out from the condenser (30) into the separator (34) through the pipe (33). The lighter phase passes through the separation layer controller (35) into the return pipe (36) and, through the latter, back into the reactor (1) or may be drained off as required into the container (40). By contrast, the heavy, water-containing phase is discharged into the container (41) through the pipe (37) and may be removed through the pipe (42).

The reaction product circulated from the reactor (1) through the circulation pipe (12), the pipe (16) and the return pipe (23) into the falling film evaporator (9) and back into the reactor (1) is heated in the falling film evaporator (9) until the desired reactions are complete. During this period, a heating medium is supplied to the falling film evaporator (9). The falling film evaporator (9) is then switched from heating to cooling, a cooling medium being supplied to the falling film evaporator (9). During cooling in the falling film evaporator (9), the reaction product is again first circulated from the reactor (1) via the circulation pipe (12), the pipe (16) and the return pipe (23) back into the falling film evaporator (9) and the reactor (1).

The circulation cooling in the falling film evaporator (9) provides for very rapid cooling of the reaction mixture so that secondary reactions are largely avoided. The reaction mixture passes through the cooling circuit several times, depending on the required degree of cooling.

After adequate cooling, the valve (21) is closed and the valve (22) opened so that the reaction product can be removed through the pipe (24). When the reactor (1) is completely empty, a new batch can be introduced through the feed pipe (25).

The invention is not of course limited to the examples of embodiment illustrated in the drawings. Other embodiments are possible without departing from the basic concept. Thus, the falling film evaporator (9) may be replaced by a thin-layer or short-path evaporator. Also, the necessary energy may be supplied by other types of heat transfer unit providing a unit for generating large liquid/gas phase interfaces, such as a spray unit for example, is mounted on the reactor. The evaporator (9) may also be operated in countercurrent, in which case the vapors are removed at the head of the evaporator while the liquid reaction product flows back into the reactor.

Alternatively, the reaction mixture may also be transported from the reactor to a plate-type, tube bundle or spiral heat exchanger and cooled therein after the reaction. In this way, it is possible for example rapidly to cool products which become highly viscous at low temperatures. It is also advisable to use a cooler of this type for example when the evaporator is operated with water-immiscible heating media, such as thermal oil.

In addition, the reaction product may be directly purified by distillation in the evaporator after the desired reaction.

The process according to the invention may be used for a number of chemical reactions. In one preferred embodiment, the process is used to carry out esterification and transesterification reactions and also glycerinolysis, aminolysis and Guerbet reactions. These reactions are generally reactions which, to obtain a sufficiently high reaction velocity, have to be carried out at temperatures at which the starting materials and/or products are already thermally labile and undergo secondary reactions. In addition, the reactions are generally equilibrium reactions. Accordingly, to achieve an adequate yield, it is necessary in most cases continuously to remove one of the reaction products from the reaction system. Because this reaction product is removed in the gas phase, good mass transfer of the component to be removed from the normally liquid reaction mixture into the gas phase is particularly important.

In one particularly preferred embodiment, the process according to the invention is used for the reaction of alcohols containing 6 to 24 carbon atoms with carboxylic acids containing at least 6 carbon atoms. These reactions are normally carried out at temperatures above 200° C. over reaction times of from 3 to 20 hours. At these temperatures, both the starting materials and the products undergo decomposition and secondary reactions to a relatively large extent.

In one particularly preferred embodiment, the process according to the invention is used to prepare oleic acid oleyl ester from oleic acid and oleyl alcohol. In this particularly preferred embodiment, the reaction time can be distinctly reduced in relation to the standard tank reactor. This is above all a result of the distinctly improved transfer of the water of reaction into the gas phase to be removed.

In another particularly preferred embodiment, the process according to the invention is used for the esterification of isotridecyl alcohol with stearic acid. In this reaction, the alcohol is normally used in a large excess. In this particularly preferred embodiment, it is of particular advantage to use a falling film evaporator for removing the excess alcohol on completion of the reaction.

In another particularly preferred embodiment, the process according to the invention is used for the esterification of methyl cyclohexanol with phthalic anhydride to form the diester. In this case, it is of particular advantage to use the process according to the invention above all for heating the product because heat damage to the product can largely be avoided by virtue of the comparatively small load on the heating surface as compared with the use of a simple stirred tank reactor.

In another preferred embodiment, the process according to the invention is used for the reaction of alcohols containing 6 to 24 carbon atoms with short-chain polymerizable carboxylic acids.

In the reaction of behenyl alcohol with fumaric acid, a particularly preferred embodiment of the process according to the invention, the reaction time can be reduced by about 40 to 80%. It is also possible by applying reduced pressure to achieve adequate reaction velocities at temperatures of only about 180° C. Comparable advantages are obtained in the reaction of fumaric acid with a mixture of alcohols essentially containing 8 to 18 carbon atoms, another particularly preferred embodiment of the process according to the invention. In every case, the suspension produced from the educts by stirring was circulated with the undissolved fumaric acid particles via the pump (13) and the falling film evaporator (9).

We claim:

1. In an esterification process in which an alcohol having 6 to 24 carbon atoms is reacted with a carboxylic acid having at least 6 carbon atoms and in which at least one of a reactant or a product is heat sensitive, the improvement wherein the process comprises the steps of:
   (1) forming a reaction mixture in a reaction zone,
   (2) continuously circulating the reaction mixture over a falling film evaporator under conditions in which at least one product of the reaction is the form of a gas phase,
   (3) continuously removing the gas phase from contact with the reaction mixture, and
   (4) returning at least a portion of the reaction mixture to the reaction zone in step (1).

2. The process of claim 1 wherein said process is operated at a pressure below atmospheric pressure.

3. The process as of claim 1, wherein said carboxylic acid is fumaric acid and said alcohol is behenyl alcohol.

4. The process of claim 1, wherein said carboxylic acid is oleic acid and said alcohol is oleyl alcohol.

5. The process of claim 1 wherein said carboxylic acid is stearic acid and said alcohol is isotridecyl alcohol.

6. The process of claim 1 wherein the process is a batch process.

7. The process of claim 1 wherein steps (2) through (4) are carried out until the reaction is substantially complete.

8. In an esterification process for the preparation of di-(methylcyclohexyl)-phthalate, the improvement wherein the esterification process comprises the steps of:
   (1) forming a reaction mixture containing phthalic anhydride and methyl cyclohexanol in a reaction zone,
   (2) continuously circulating the reaction mixture over a falling film evaporator under conditions such that water of reaction is in the form of steam,
   (3) continuously removing the steam from contact with the reaction mixture, and
   (4) returning at least a portion of the reaction mixture to the reaction zone in step (1).

9. The process of claim 8 wherein said process is operated at a pressure below atmospheric pressure.

10. The process of claim 8 wherein the diphthalate is distilled in said falling film evaporator.

11. The process of claim 8 wherein steps (2) through (4) are carried out until the esterification is substantially complete.

* * * * *